(No Model.)

W. FLEMING.
VARIABLE FRICTION FEED MECHANISM FOR SAWMILLS.

No. 514,314. Patented Feb. 6, 1894.

WITNESSES:
William Goebel
C. Sedgwick

INVENTOR
W. Fleming
BY
Munn & Co
ATTORNEYS.

UNITED STATES PATENT OFFICE.

WILLIAM FLEMING, OF ATHENS, GEORGIA.

VARIABLE FRICTION-FEED MECHANISM FOR SAWMILLS.

SPECIFICATION forming part of Letters Patent No. 514,314, dated February 6, 1894.

Application filed May 3, 1893. Serial No. 472,887. (No model.)

*To all whom it may concern:*

Be it known that I, WILLIAM FLEMING, of Athens, in the county of Clarke and State of Georgia, have invented a new and Improved Variable Feed for Sawmills, of which the following is a full, clear, and exact description.

My invention is an improvement in the class of variable, friction-feed mechanism for sawmills, and it is embodied in the construction and arrangement of a pivoted rotary shaft, and shiftable friction disk mounted on a sliding sleeve, and a hand lever which is pivoted to said sleeve and adapted to be moved at will in either of two directions, at right angles to each other, for the purpose of feeding the log-carriage forward and back and also for regulating the speed of its movement.

To this end my invention consists of certain features of construction and combinations of the same, as will be hereinafter described and claimed.

Reference is to be had to the accompanying drawings forming a part of this specification, in which similar figures of reference indicate corresponding parts in both the views.

Figure 1:
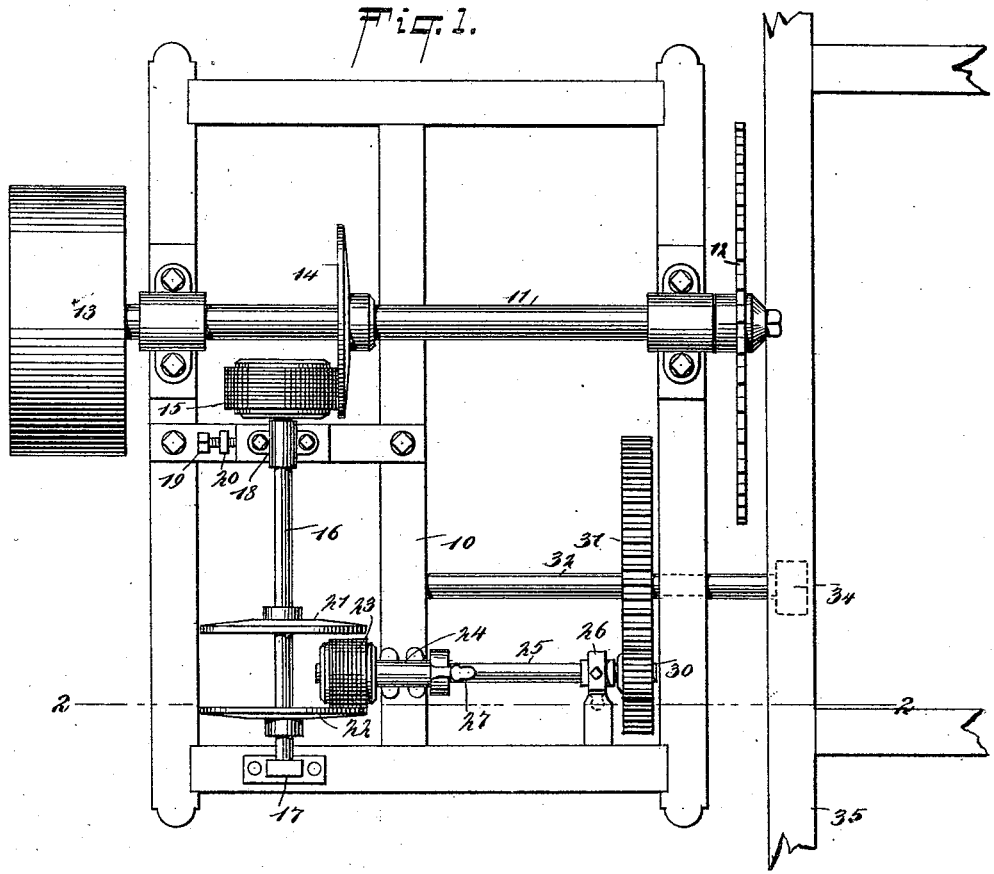
Figure 2:
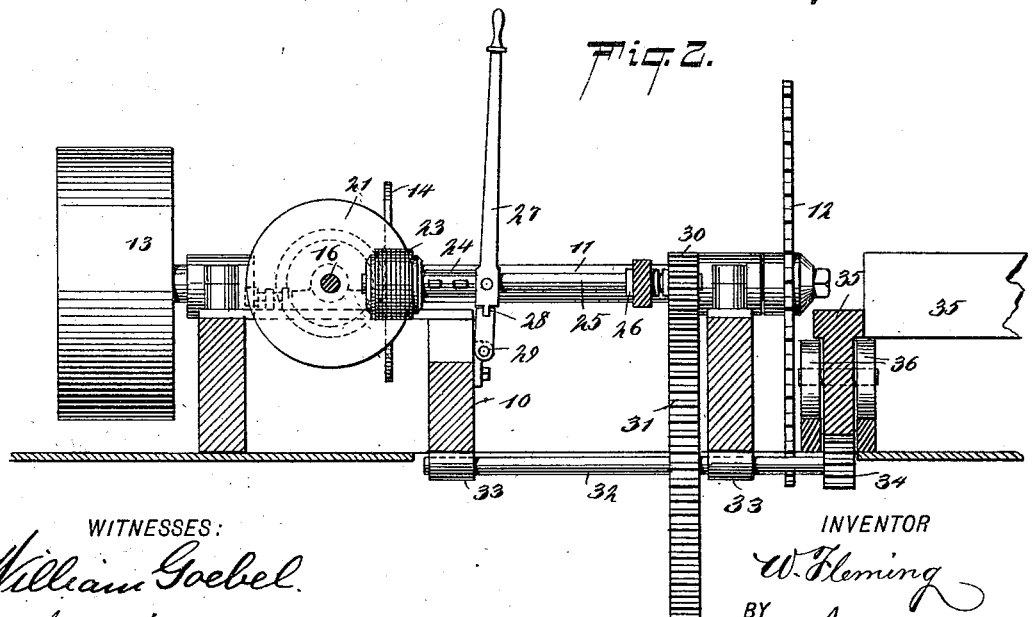

Figure 1 is a broken plan view of the mechanism embodying my invention; and Fig. 2 is a cross section on the line 2—2 in Fig. 1.

The frame 10 is of the usual kind and on it is journaled in the customary way a saw mandrel 11 which has the usual saw 12 at one end and the customary driving pulley 13 at the other. On the mandrel 11 is a friction disk 14 which is adapted to engage a friction wheel 15 on the shaft 16, which shaft extends at right angles to the mandrel 11 and is journaled in suitable boxes 17 and 18, the latter being adjusted laterally by means of a set screw 19 and lug 20 in which the set screw is threaded, and by adjusting the set screw and box the friction wheel 15 may be made to press with greater or less force against the friction disk 14.

The shaft 16 carries parallel friction disks 21 and 22 between which is arranged a friction wheel 23, and this wheel is adapted to contact with either of the disks 21 or 22, and the direction in which the wheel 23 turns depends upon which disk it is brought in contact with. The wheel 23 is carried by a sleeve 24 which is keyed in a common and well known manner to the shaft 25, so as to slide thereon and turn therewith, and this arrangement enables the friction wheel to be brought in contact with one of the disks at any point between the center of the disks and their peripheries, so that the speed of the wheel may thus be regulated.

The shaft 25 extends parallel with the mandrel 11 and at one end it is held in a swivel box 26 of the usual kind, and near its other end it is supported in the sleeve 24 which slides on the shaft 25 above the frame.

The friction wheel 23 is operated; that is, moved into contact with either of the disks 21 or 22 and into the desired position in relation to the disks, by a lever 27 which is connected to the sleeve 24 and is pivoted, as shown at 28, to a link, 29, which is in turn pivoted to the fixed frame 10. The form of connection between the lever and link is a knuckle-joint, which is flexible in one direction (laterally), but not in the other. Hence the link, 29, serves as a loose fulcrum for the lever when the latter is shifted sidewise, but constitutes, virtually, a rigid extension of the lever when the latter is moved in the opposite direction to slide the sleeve on the shaft. Thus, by this simple and compact arrangement of but two parts, the link and lever, with the sleeve, I am enabled to shift the friction wheel, 23, in two directions, for regulating the feed as desired.

The shaft 25 has at one end a pinion 30 which engages a gear wheel 31 on the shaft 32, which shaft is journaled as shown at 33 on the under side of the frame 10 parallel with the saw mandrel, and it projects in the usual way beneath the front side of the carriage 35 and carries a pinion 34 which engages, in the customary manner with a rack on the lower edge and front side of the carriage. The carriage 35, as shown, is of the usual kind, running on rollers 36, and it may be of any customary description.

It will be seen that by throwing the lever 27 so as to move the friction wheel 23 into contact with the disk 21 the shaft 25 will be turned in one direction and the carriage correspondingly moved and that by moving the friction wheel into contact with the opposite disk, the direction of the shaft and carriage is reversed, while by moving the friction wheel longitudinally on the shaft the speed of the carriage may be controlled.

Having thus described my invention, I claim as new and desire to secure by Letters Patent—

In a variable feed for saw mills, the combination with the parallel friction disks, suitable gearing for connecting them with the saw mandrel, a laterally shiftable shaft, a sleeve slidable on the latter, and a friction wheel carried by said sleeve, of a vertical hand lever, which is pivotally connected with said sleeve, and a link pivoted to a fixed frame beneath the shaft and having a knuckle joint connection with the said lever, whereby it preserves alignment with the lever and thus serves as an extension of it when the lever is operated to slide the sleeve on the shaft, but constitutes a loose fulcrum for said lever when the latter is tilted sidewise, as shown and described.

WILLIAM FLEMING.

Witnesses:
   THOS. A. PANEL,
   GEO. C. MEADOWCROFT.